April 24, 1951 C. STROHM 2,550,618
CHART-PLATE FOR INSTRUMENT CASES
Filed June 13, 1946
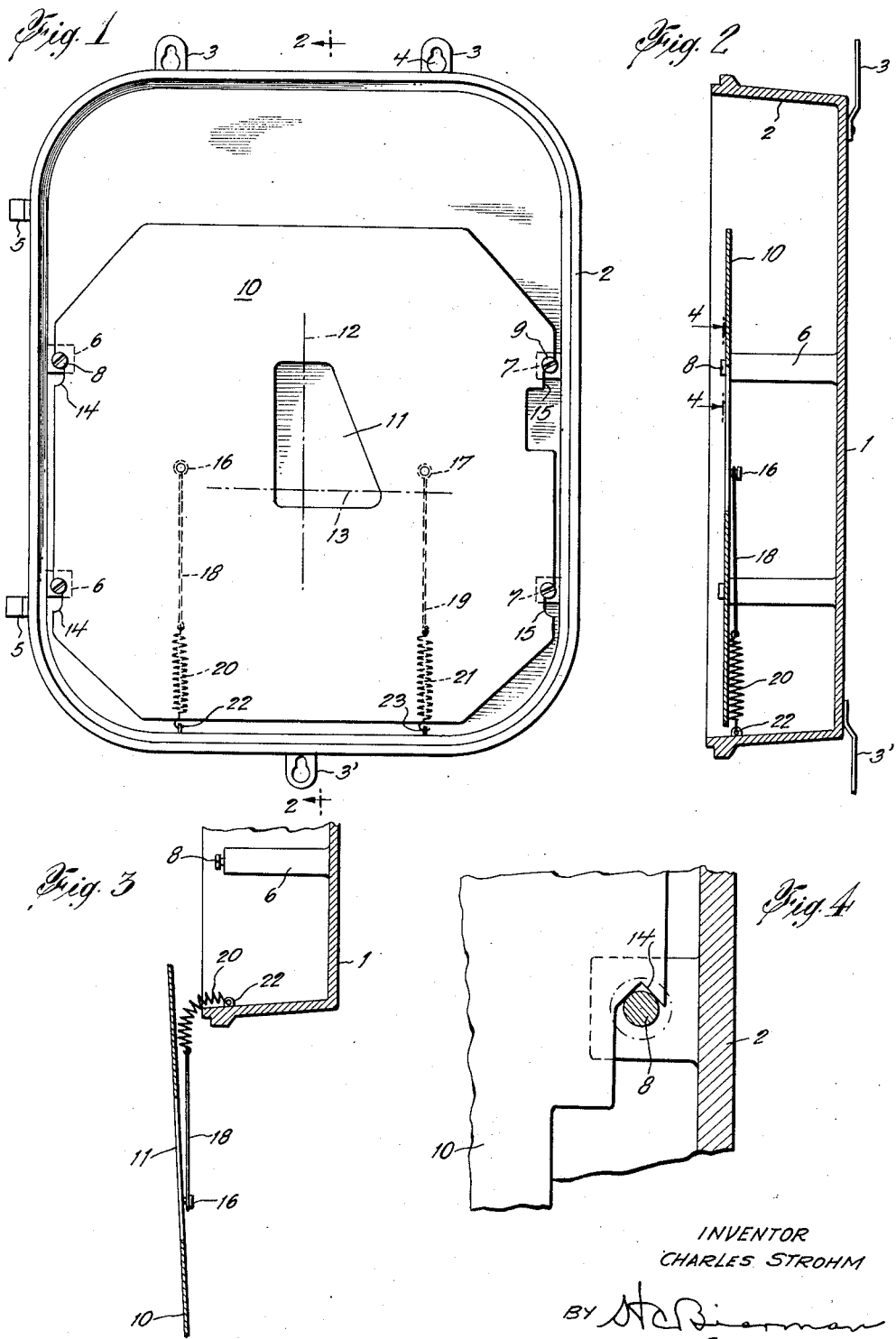
INVENTOR
CHARLES STROHM
BY H.C.Bierman
ATTORNEY Patented Apr. 24, 1951

2,550,618

UNITED STATES PATENT OFFICE 2,550,618

CHART PLATE FOR INSTRUMENT CASES

Charles Strohm, Laurelton, N. Y., assignor, by mesne assignments, to American Machine and Metals, Inc., New York, N. Y., a corporation of Delaware Application June 13, 1946, Serial No. 676,557

6 Claims. (Cl. 346—145)

The present invention is directed to cases adapted particularly for use in housing instruments, particularly for the purpose of recording data on a chart contained within said case.

Recording instruments of various types, such as pressure recorders and temperature recorders, have long been known and used. They consist of a mechanism which is mounted in a box-like structure having an open face and there is provided a plate over the mechanism and secured to the inside of the box. The plate carries a chart and a stylus or pen is adapted to move over the plate and chart in the course of its recording functions. Very frequently it is necessary to gain access to the instrument case for various purposes, such as for inspection, cleaning, repair, and the like. To do this, it was necessary to loosen the chart-plate and to remove the same from the instrument. This required the use of both hands and made it rather awkward for a single operator to adequately manipulate the several elements for the desired purpose.

The present invention is intended and adapted to overcome the difficulties and disadvantages inherent in prior structures of the type described, it being among the objects of the present invention to provide an instrument case containing a chart-plate wherein the same may be readily introduced or removed by the operator with one hand, and allowing the operator the free use of the other hand for various purposes.

It is also among the objects of the present invention to provide a structure embodying a chart-plate which is permanently attached to the instrument case and which may be readily removed or returned to operative position.

In practicing the present invention, there is provided the usual box-like structure with the usual mechanism for recording purposes. A chart-plate is provided and is mounted on suitable supports integral with the instrument case and having means thereon for retaining the plate in proper position. There is further provided a plurality of extensible members, usually in the form of coil springs, one end of which is attached to a suitable part of the instrument case as the inner face of the lower end thereof. The opposite end of each spring is attached to the underside of the chart-plate, usually above the transverse centerline thereof, and the two springs are usually spaced equally on either side of the longitudinal centerline thereof. The arrangement is such that when the chart-plate is in position within the instrument case, the springs lie substantially parallel and closely adjacent thereto.

The operation of the device is quite simple. Assuming the plate to be in its operative position and it is desired to remove the same from the instrument case, the plate is grasped by one hand and lifted slightly upward so that it is released from its support and then it is lowered until it is suspended from the springs. It is maintained in a vertical position due to the fact that the attachment of the springs to the plate is above the transverse centerline thereof. Therefore, it is in a position where a chart may be removed therefrom and replaced by a new chart. In returning the plate to its operative position, it is again grasped by the fingers of one hand, lifted up and replaced on its support.

In the accompanying drawings constituting a part hereof, in which like reference characters indicate like parts, and in which Fig. 1 is a front elevational view of an instrument case made in accordance with the present invention;

Fig. 2 is a vertical cross-sectional view thereof taken along line 2—2 of Fig. 1;

Fig. 3 is a fragmentary view similar to Fig. 2, showing the chart-plate removed from the instrument case and suspended by the springs; and Fig. 4 is a fragmentary enlarged cross-sectional view taken along the line 4—4 of Fig. 2.

The instrument case consists of a box-like structure having a bottom 1 and four side walls 2. A pair of ears 3 secured to the upper end thereof has openings 4 therein, whereby the instrument case may be mounted on the heads of screws or the like. Hinges 5 along one side of the instrument case provide means for attaching a suitable cover thereto. An ear 3' is provided at the bottom of the case to further retain the case in position. A pair of supports 6 is formed integrally with the case at one side thereof and a duplicate pair of supports 7 is formed at the opposite side. Screws 8 and 9 are threaded into the top of supports 6 and 7. A chart-plate 10 of any suitable construction and size and material has a central opening 11 of suitable form, depending on the character of the mechanism contained within the instrument case. The longitudinal centerline 12 of the plate 10 intersects the transverse centerline 13 thereof within opening 11. Plate 10 is provided with cut-out portions 14 forming recesses of hook-like nature, said recesses being provided immediately above the tops of supports 6. A similar set of recesses 15 is provided on the opposite side of plate 10 above supports 7.

On the lower side of plate 10 are a pair of screws 16 and 17 located laterally of centerline 12 and equally spaced therefrom. Said screws are also located above transverse centerline 13. Secured to screws 16 and 17 are a pair of chains 18 and 19, the free ends of which are secured to helical springs 20 and 21, the free ends of said springs being in turn secured to eyes 22 and 23 in the inner face of the lower ends of the instrument case. The chains and springs are roughly parallel to the underside of the plate and closely adjacent thereto.

When the plate is in operative position, it is as illustrated in Figs. 1, 2 and 4, with the recesses contacting with the stems of screws 8 and 9 and the heads thereof overlying the plate. If desired, the screws may be tightened onto the plate or they may be allowed to remain in such position that the plate is relatively loosely mounted thereon. To remove the plate, it is lifted until recesses 14 are free from the heads of screws 8 and 9, after which the plate is moved forwardly out of the instrument case and lowered into the position shown in Fig. 3. Because of the arrangement as described above, plate 10 will hang in a vertical position so that the chart may be removed therefrom and a new one substituted for the same. If any adjustment or change in the mechanism is necessary, the operator has both hands free for this purpose. The chart-plate is always in a convenient position and cannot be lost. To replace the same, the operator merely reverses movements of the plate.

Although I have described the invention setting forth a single embodiment thereof, said embodiment is intended to illustrate the nature of the invention and not to limit the same. Various changes in the details of construction may be made without departing from the principles herein set forth. For instance, plate 10 need not be symmetrical but may be of any desired shape. The plate may be elongated so that it fills the entire instrument case, or it may be made of a smaller area and of irregular form. The means for retaining the plate on the support may be different from that described, as equivalent structures for the purpose are known. Chains 18 and 19 may be omitted and the springs may extend directly from screws 16 and 17 to points 22 and 23, and cord, wire or the like may be substituted for the chains. In place of springs 20 and 21, other elastic materials, such as rubber, or the like may be substituted. It is desirable that the material used shall have sufficient elasticity so as to exert a force tending to retain notches 14 against screws 8 and 9 against the normal forces encountered in the operation of an instrument.

These and other changes in the details of the embodiment of the invention may be made within the spirit thereof and the invention is therefore to be broadly construed and not to be limited except by the character of the claims appended hereto.

I claim:

1. An instrument case comprising a box-like structure having an open face, a chart-plate in said opening, supports in said box on which said plate is adapted to be held, an extensible member attached to the bottom of said box and to the rear face of said plate, whereby said plate may be removed from said supports while attached to said box so as to be suspended with the chart face of said plate facing forwardly, said plate in said suspended position being substantially vertical, the elasticity of said extensible members exerting a force tending to retain said chart-plate on its supports when said plate is in operative position in said case.

2. An instrument case comprising a box-like structure having an open face, a chart-plate in said opening, supports in said box on which said plate is adapted to be held, a pair of extensible members attached to the bottom of said box and to the rear face of said plate on opposite sides of the longitudinal centerline of said plate, whereby said plate may be removed from said supports while attached to said box so as to be suspended with the chart face of said plate facing forwardly, said plate in said suspended position being substantially vertical, the elasticity of said extensible members exerting a force tending to retain said chart-plate on its supports when said plate is in operative position in said case.

3. An instrument case comprising a box-like structure having an open face, a chart-plate in said opening, supports in said box on which said plate is adapted to be held, a pair of extensible members attached to the bottom of said box and to the rear face of said plate on opposite sides of the longitudinal centerline of said plate, the attachment to said plate being above the transverse centerline of said plate and above the attachment to said box so as to be suspended with the chart face of said plate facing forwardly, said plate in said suspended position being substantially vertical, whereby said plate may be removed from said supports while attached to said box, the elasticity of said extensible members exerting a force tending to retain said chart-plate on its supports when said plate is in operative position in said case.

4. An instrument case comprising a box-like structure having an open face, a chart-plate in said opening, supports in said box on which said plate is adapted to be held, an extensible member attached to the bottom of said box and to the rear face of said plate, whereby said plate may be removed from said supports while attached to said box so as to be suspended with the chart face of said plate facing forwardly, said plate in said suspended position being substantially vertical, said supports being on opposite sides of said plate and box, and means on said supports for retaining said plate in position, the elasticity of said extensible members exerting a force tending to retain said chart-plate on its supports when said plate is in operative position in said case.

5. An instrument case comprising a box-like structure having an open face, a chart-plate in said opening, supports in said box on which said plate is adapted to be held, an extensible member attached to the bottom of said box and to the rear face of said plate, whereby said plate may be removed from said supports while attached to said box so as to be suspended with the chart face of said plate facing forwardly, said plate in said suspended position being substantially vertical, recesses along the edges of said plate adjacent to said supports, and retainers on said supports adapted to cooperate with said recesses to hold said plate in position, the elasticity of said extensible members exerting a force tending to retain said chart-plate on its supports when said plate is in operative position in said case.

6. An instrument case comprising a box-like structure having an open face, a chart-plate in said opening, supports in said box on which said plate is adapted to be held, a pair of extensible members attached to the bottom of said box and to the rear face of said plate on opposite sides of the longitudinal centerline of said plate, the attachment to said plate being above the transverse centerline of said plate and above the attachment to said box, whereby said plate may be removed from said supports while attached to said box so as to be suspended with the chart face of said plate facing forwardly, said plate in said suspended position being substantially vertical, recesses along the edges of said plate adjacent to said supports, and retainers on said supports adapted to cooperate with said recesses to hold said plate in position, the elasticity of said extensible members exerting a force tending to retain said chart-plate on its supports when said plate is in operative position in said case.

CHARLES STROHM.

REFERENCES CITED

The following references are of record in the file of this patent:

UNITED STATES PATENTS

| Number | Name | Date |
|---|---|---|
| 638,334 | Hobert | Dec. 5, 1899 |
| 1,462,438 | Apple | July 17, 1923 |
| 1,503,353 | Dugan | July 29, 1924 |
| 1,589,771 | Tucker | June 22, 1926 |
| 1,753,923 | Felty | Apr. 8, 1930 |
| 2,436,971 | Moore | Mar. 2, 1948 |